United States Patent [19]

Watanabe

[11] Patent Number: 5,500,491
[45] Date of Patent: Mar. 19, 1996

[54] OPTICAL WRITING TYPE ELECTRO-OPTICAL DEVICE

[75] Inventor: Masao Watanabe, Kanagawa, Japan

[73] Assignee: Fuji Xerox Co., Ltd., Tokyo, Japan

[21] Appl. No.: 325,620

[22] Filed: Oct. 19, 1994

[30] Foreign Application Priority Data

Nov. 10, 1993 [JP] Japan .................. 5-303227

[51] Int. Cl.⁶ .............. G08C 21/00; G02F 1/1335; G02F 1/135
[52] U.S. Cl. ................. 178/18; 359/67; 359/71; 359/72
[58] Field of Search ............. 178/18; 359/36, 359/66, 67, 71, 72, 73, 74, 79, 84

[56] References Cited

U.S. PATENT DOCUMENTS

| | | | |
|---|---|---|---|
| 5,132,814 | 7/1992 | Ohkouchi et al. | 359/72 X |
| 5,178,445 | 1/1993 | Moddel et al. | 359/72 X |
| 5,233,450 | 8/1993 | Hatano et al. | 359/72 |
| 5,272,554 | 12/1993 | Ji et al. | 359/67 |
| 5,307,186 | 4/1994 | Izumi et al. | 359/72 X |
| 5,309,262 | 5/1994 | Haas | 359/67 |

FOREIGN PATENT DOCUMENTS

| | | |
|---|---|---|
| 49-90155 | 8/1974 | Japan . |
| 59-216126 | 12/1984 | Japan . |

*Primary Examiner*—Stephen Chin
*Assistant Examiner*—Paul Loomis
*Attorney, Agent, or Firm*—Finnegan, Henderson, Farabow, Garrett & Dunner

[57] ABSTRACT

An optical modulation member having a memory function to which information is to be written by using an optical signal is disposed between two transparent electrodes opposed to each other. A photoconductive member includes an amorphous silicon type photoconductive layer disposed adjacent to the optical modulation member, and a thin film disposed between the photoconductive layer and one of the two transparent electrode and made of a material having a band gap of not less than 3 eV.

11 Claims, 1 Drawing Sheet

OPTICAL WRITING TYPE ELECTRO-OPTICAL DEVICE

BACKGROUND OF THE INVENTION

1. Field of the Invention

The present invention relates to an optical writing type electro-optical device for writing information into an optical modulation member in accordance with an optical signal under application of a voltage.

2. Discussion of the Related Art

As described in Japanese Unexamined Patent Publication Nos. Sho. 59-216126 and Sho. 49-90155, conventional optical writing type electro-optical devices have a cell structure consisting of an optical modulation member (liquid crystal layer) and a photoconductive layer that is homogeneous in a plane expanse. This type of electro-optical device employs amorphous silicon hydride (a-Si:H) for the photoconductive layer, and utilizes its photoelectric effect. In this cell structure, the dark conductivity of the photoconductive layer is approximately equal to the conductivity ($10^{-11}$ $\Omega^{-1}\text{cm}^{-1}$) of the liquid crystal layer. Therefore, even in a dark state, the impedances of the two layers are approximately equal to each other, to cause a considerable voltage to be applied to the liquid crystal layer. On the other hand, in a bright state, the impedance of the photoconductive layer decreases to be lower than that of the liquid crystal layer, so that an almost full voltage is applied to the liquid crystal layer. Therefore, the electro-optical device of the above structure cannot produce high-contrast images because of a small difference between on- and off-voltages (bright and dark voltages) of the liquid crystal layer.

To solve the above problem, there is a proposal in which the photoconductive layer is constructed so as to have a diode structure. Utilizing the phenomenon that the impedance of this photoconductive layer becomes high when reversely biased in a dark state, the proposal device is so designed that almost no voltage is applied to the liquid crystal layer in a dark state, to thereby obtain a large on/off (bright/dark) voltage difference of the liquid crystal layer. However, when an AC voltage is applied to the device having the diode-type photoconductive layer, the voltage applied to the liquid crystal layer depends on the polarity of the AC voltage because the diode structure shows different characteristics in the forward and reverse directions. This results in an improper operation of the liquid crystal layer.

In addition, conventional optical writing type electro-optical device have a problem that a thick photoconductive layer is needed for the impedance matching between the liquid crystal layer and the photoconductive layer.

SUMMARY OF THE INVENTION

The present invention has been made to solve the above problems. Accordingly, an object of the invention is to provide an optical writing type electro-optical device which enables proper operation of an optical modulation member by controlling the impedance of a photoconductive layer without thickening this layer.

The present inventor has found that by using a thin film made of a material having a band gap of not less than 3 eV to constitute a photoconductive member together with a photoconductive layer, impedance matching can be effected between the photoconductive layer and a liquid crystal layer, to thereby increase an optical switching ratio of an optical writing type electro-optical device, and the electro-optical device can be manufactured more properly. The invention is based on these findings.

According to the invention, an optical writing type electro-optical device comprises:

two transparent electrodes opposed to each other;

an optical modulation member having a memory function to which information is to be written by using an optical signal, the optical modulation member being disposed between the two transparent electrodes; and a photoconductive member comprising an amorphous silicon type photoconductive layer disposed adjacent to the optical modulation member, and a thin film disposed between the photoconductive layer and one of the two transparent electrodes and made of a material having a band gap of not less than 3 eV.

DESCRIPTION OF THE PREFERRED EMBODIMENTS

An optical writing type electro-optical device according to the present invention will be described in detail with reference to the accompanying drawings.

Figure 1:
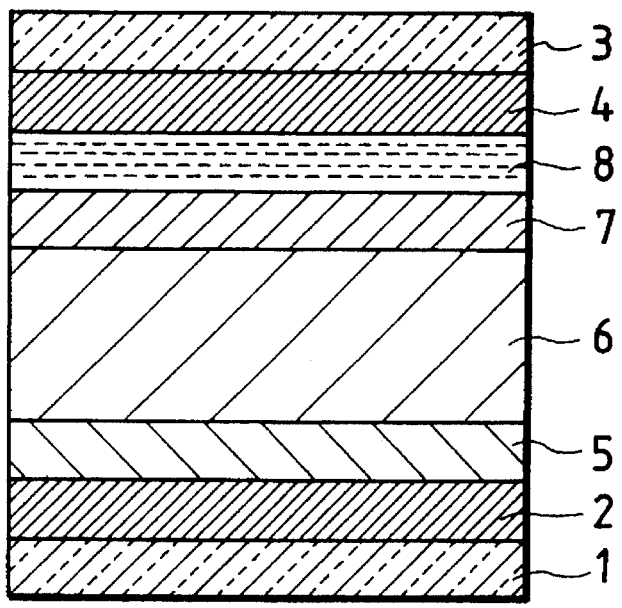
FIG. 1 is a sectional view schematically showing an optical writing type electro-optical device according to the present invention.

FIG. 1 is a sectional view schematically showing an optical writing type electro-optical device according to the invention. As shown, a transparent electrode 2 is formed on one of the major surfaces of a first transparent substrate 1, while a transparent electrode 4 is formed on one of the major surfaces of a second transparent substrate 3. A photoconductive member and an optical modulation member are formed between the transparent electrodes 2 and 4. The photoconductive member consists of a thin film 5 made of a material having a band gap of 3 eV or larger and an amorphous silicon type photoconductive layer 6. A liquid crystal layer 8 serves as the optical modulation member. A light absorption layer 7 is inserted between the photoconductive layer 6 and the liquid crystal layer 8. The layers 5–8 are sequentially laid one on another between the transparent electrodes 2 and 4, to constitute a cell structure.

The transparent substrates 1 and 3 may be a film or a plate made of any of transparent inorganic materials such as glass, quartz and sapphire, and organic resins such as fluorocarbon polymers, polyester, polycarbonate, polyethylene, polyethylene terephthalate, vinylon, epoxy, Mylar. The transparent substrates 1 and 3 may also be an optical fiber or a SELFOC optical plate.

The transparent electrodes 2 and 4 formed on the respective transparent substrates 1 and 3 may be formed by evaporation, ion plating, sputtering or some other method using any of transparent conductive materials such as ITO, zinc oxide, tin oxide, lead oxide, indium oxide, and copper iodide. Alternatively, the transparent electrodes 2 and 4 may be formed by evaporation, sputtering or some other method using a thin film of a metal such as Al, Ni or Au so as to be thin enough to be semitransparent. Generally, the thickness is set at 10–500 nm.

The photoconductive member has a layered structure consisting of the amorphous silicon type photoconductive layer 6 and the thin film 5 made of a material having a band gap of 3 eV of larger. The amorphous silicon type photoconductive layer 6 may have a single-layer structure or a layered structure.

The amorphous silicon type photoconductive layer 6 may be made deposited by a glow discharge method, sputtering, an ECR method, evaporation, or some other method. In forming photoconductive layer 6, it is preferable to add an element for dangling bond termination, such as hydrogen or halogen. An amorphous silicon hydride (a-Si:H) layer is particularly preferable for the photoconductive layer 6.

Properties, such as conductivity, band gap and surface hardness, of the amorphous silicon type photoconductive layer 6 may be altered by replacing part of silicon atoms with atoms of carbon, oxygen, nitrogen, germanium, tin, sulfur, or some other element. Where a LED head is used as a writing light source, the amorphous silicon type photoconductive layer 6 can effectively receive light emitted from that light source without any element replacement. However, where an EL head is used, in which case emitted light has shorter wavelengths, the band gap of the photoconductive layer 6 may be broadened by incorporating such an element as carbon, oxygen or nitrogen. Where a semiconductor laser is used, in which case emitted light has a longer wavelength, the band gap may be narrowed by incorporating such an element as germanium or tin.

Electrical characteristics of the amorphous silicon type photoconductive layer 6 may be adjusted by adding elements of group IIIa or group Va.

It is preferred that the thickness of the amorphous silicon type photoconductive layer 6 be 0.1–10 μm.

The thin film 5 is made of a material having a band gap of a 3 eV or larger which material is semiconductive or insulative. In the following description, the semiconductive material means a material whose resistivity is $10^{-4}$–$10^{10}$ Ωcm, and the insulative material means a material whose resistivity is not less than $10^{10}$ Ωcm.

In the invention, a material constituting the thin film 5 is required to have a band gap of 3 eV or larger, preferably 3–7 eV. If the band gap is smaller than 3 eV, high-contrast images cannot be obtained.

$TaO_x$ (x=1.0 to 2.5) is preferably used as a material for the thin film 5 having a band gap of 3 eV or larger. Other examples are CaS (5.4 eV), CaSe (5.0 eV), CaTe (4.3 eV), MgSe (5.6 eV), MgTe (4.7 eV), ZnO (3.2 eV), ZnS (3.7 eV), SrO (5.8 eV), SrS (4.8 eV), SrSe (4.6 eV), SrTe (4.0 eV), $TiO_2$ (3.0 eV) and $SnO_2$ (4.3 eV).

The thin film 5 made of a material of a band gap of 3 eV or larger may be formed by, for instance, evaporation using any of the above materials. It is preferred that the thickness of the thin film 5 be 0.01–1 μm.

Provided at the interface between the transparent electrode 2 and the amorphous silicon type photoconductive layer 6, the thin film 5 functions as follows. In illuminated regions, the thin film 5 allows charge injection from the transparent electrode 2 to the photoconductive layer 6 due to a variation of an electric field that is caused by a conductivity variation in the photoconductive layer 6. On the other hand, when no illumination is effected or in non-illuminated regions, the thin film 5 prohibits charge injection from the transparent electrode 2 to the photoconductive layer 6 by impedance matching based on a dark resistance of the photoconductive layer 6. The material, specifically, its band gap, of the thin-film 5 is selected so as to satisfy the above conditions. With the provision of the thin film 5, a difference between a voltage applied to illuminated regions of the liquid crystal layer 8 and a voltage applied to non-illuminated regions (or a voltage applied when no illumination is effected) can be made larger. That is, a high contrast can be obtained.

The refractive index of the thin film 5 increases in proportion to its band gap. Therefore, the provision of the thin-film 5 increases the absolute value of the quantity of light incident on the photoconductive layer 6 from the case of not using the thin film 5, further increasing a difference between a contrast when illumination is effected and a contrast when illumination is not effected. The refractive index of the thin film 5 should be not more than 3, preferably in the range of 1 to 2.

The thin film 5 also functions to prevent metal of the transparent electrode 2 from diffusing into the photoconductive layer 6, and to improve adhesion between the electrode 2 and the photoconductive layer 6.

The optical modulation member with a memory function is a polymer-liquid crystal composite film formed by dispersing a liquid crystal in a polymer film or a polymer liquid crystal film formed by polymerizing a liquid crystal with a polymer film. Various liquid crystals for general display purposes of the nematic type, cholesteric type, smectic type and ferroelectric type may be used. Specifically, there may be used liquid crystal compounds of the biphenyl type, phenyl benzoate type, cyclohexylbenzene type, azoxybenzene type, azobenzene type, azomethine type, terphenyl type, biphenyl benzoate type, cyclohexylbiphenyl type, phenylpyrimidine type, cyclohexylpyrimidine type, and cholesterol type. The above liquid crystal compounds may be used either singly or in combination. Particularly preferable is a polymer-liquid crystal composite film formed by dispersing a smectic, nematic, or some other type of liquid crystal in a polymer such as a polyester resin or a polycarbonate resin. A preferable thickness range of the liquid crystal layer is 1–100 μm.

In the optical writing type electro-optical device of the invention, it is desirable that the light absorption layer 7 be inserted between the liquid crystal layer 8 and the amorphous silicon type photoconductive layer 6. The light absorption layer 7 may be formed by coating a paint that has been prepared by diffusing a light absorbing pigment such as carbon black in an acrylic resin, a photopolymeric resin of a polyimide type, polyamide type or some other type, or a thermoset resin such as an epoxy resin or a melamine resin, and then exposing the paint to light or heating it.

The transmittance and the resistivity of the light absorption layer 7 vary the content of the light absorption pigment. In the invention, it is desirable that the transmittance and the resistivity De not more than 0.5% and not less than $10^6$ Ωcm, respectively. A preferable thickness range of the light absorption layer 7 is 0.1–100 μm.

An anti-reflection layer may be formed on the transparent substrates 1 and 3 to prevent reflection by the surfaces of the transparent substrates 1 and 3. The anti-reflection layer may be formed by evaporating $MgF_2$, for example.

To have the above optical writing type electro-optical device operate, an AC voltage of 30 V, for example, is applied between the opposed transparent electrodes 2 and 4. If, under this condition, a laser beam is applied from the photoconductive member side, the impedance of the amorphous silicon type photoconductive layer 6 of the photoconductive member decreases in exposed regions and, in those regions, the AC voltage is mainly applied to the liquid crystal layer 8 of the optical modulation member. Thus, orientations of liquid crystal molecules are changed. On the other hand, in regions not exposed to the laser beam, the impedance remains unchanged, and liquid crystal molecules maintain their initial orientations. As a result, an image is formed in the liquid crystal layer 8 in accordance with the incident light.

Since the photoconductive member consists of the amorphous silicon type photoconductive layer 6 and the thin film 5 made of a material having a band gap of a 3 eV or larger, the optical modulation member can operate properly by controlling the impedance of the photoconductive layer 6 without thickening it. Further, the adhesion of the amorphous silicon type photoconductive layer 6 to the transparent electrode 2 is improved. Further, it can be prevented that electrical characteristics of the device deteriorate due to diffusion of a trace of metal into the photoconductive layer 6 from the transparent electrode 2.

EMBODIMENT 1

Figure 2:
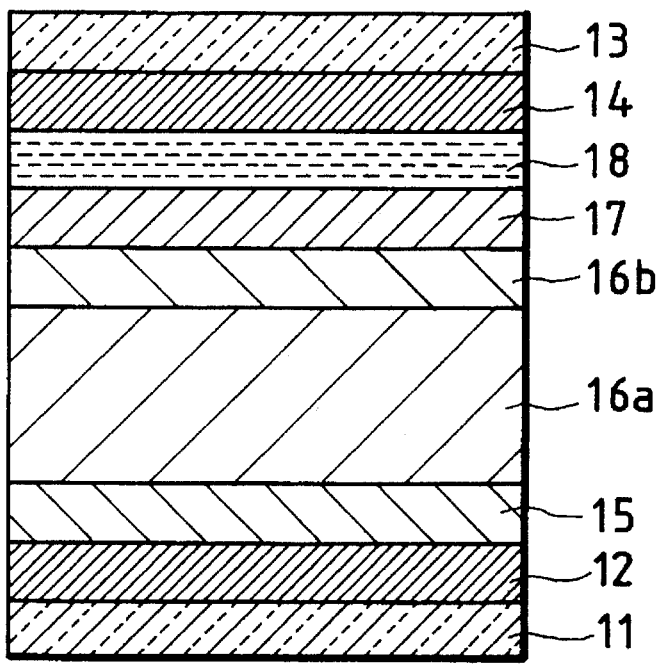
FIG. 2 is a sectional view schematically showing an optical writing type electro-optical device according to a first embodiment of the invention.

FIG. 2 is a sectional view showing an optical writing type electro-optical device (liquid crystal light bulb) according to a first embodiment of the invention.

A 100-nm-thick ITO film 12 as a transparent conductive layer was formed on a transparent glass substrate 11 by an ion plating method. Then, a 50-nm-thick $TaO_x$ (x=1.8) layer 15 (5.2 eV) was formed on the ITO film 12 by evaporation. The refractive index of the $TaO_x$ layer was 1.4.

To form an amorphous silicon type photoconductive layer, an a-Si:H layer 16a and an a-SiN layer 16b (2.5 eV) were successively laid on the thus-formed $TaO_x$ layer 15 using a capacitor type glow discharge decomposition apparatus under film depositing conditions shown in Table 1.

TABLE 1

| | $SiH_4$ (sccm) | $H_2$ (sccm) | $NH_3$ (sccm) | Gas pressure (Torr) | RF power (W) | Thickness (μm) |
|---|---|---|---|---|---|---|
| a-SiN layer | 100 | 100 | 150 | 1.0 | 200 | 0.2 |
| a-Si:H layer | 100 | 100 | — | 1.0 | 200 | 3 |

Then, a light absorption layer 17 of a carbon dispersion type paint (organic film) was formed on the thus-formed amorphous silicon type photoconductive layer. More specifically, a carbon-type paint formed by dispersing carbon black in an acrylic resin was coated with a spinner, exposed to light for photo-polymerization, and sintered at 220° C. for one hour. As a result, a light absorption layer 17 was formed which has a thickness of about 1 μm, a resistivity of $10^7$ Ωcm, and a visible range transmittance of about 0.1%.

Further, a scattering type liquid crystal composite film 18 was formed on the light absorption layer 17 thus formed. More specifically, a coating liquid was prepared by adding an ultraviolet-polymerization initiator (Darocur 1173 manufactured by Chibagaigy AG) of 2 wt % to a mixture of a monomer and a nematic liquid crystal (E7 (trade name) manufactured by Merck Co. Ltd.) that were mixed at 15:85, where the monomer was prepared by mixing n-butyl acrylate and 1, 6-hexylene diacrylate at 3:1. The coating liquid thus prepared was applied to the light absorption layer 17, and the resulting structure was exposed to ultraviolet light. As a result, a scattering type liquid crystal composite film 18 of 10 μm in thickness was formed.

A layered body consisting of an ITO film 14 and a glass substrate 13 was laid on the liquid crystal composite film thus formed, where the layered body was prepared by forming a 100-nm-thick ITO film on a second glass substrate by sputtering.

With an AC voltage of 30 V applied between the opposed ITO films 12 and 14 of the optical writing type electro-optical device having the above structure, image writing was conducted using 660-nm-wavelength light with a 0.4 μJ/cm² exposure. In this experiment, high-resolution, high-contrast images were produced.

EMBODIMENT 2

A 100-nm-thick ITO film 12 as a transparent conductive layer was formed on a transparent glass substrate by an ion plating method. Then, a 50-nm-thick $TaO_x$ (x=1.8) layer (5.2 eV) was formed on the ITO film by evaporation. The refractive index of the $TaO_x$ layer was 1.4.

Further, an a-Si:H layer and an a-SiC layer (2.1 eV) were successively laid on the thus-formed $TaO_x$ layer using a capacitor type glow discharge decomposition apparatus under film depositing conditions shown in Table 2.

TABLE 2

| | $SiH_4$ (sccm) | $H_2$ (sccm) | $C_2H_4$ (sccm) | Gas pressure (Torr) | RF power (W) | Thickness (μm) |
|---|---|---|---|---|---|---|
| a-SiC layer | 100 | 100 | 150 | 1.0 | 200 | 0.2 |
| a-Si:H layer | 100 | 100 | — | 1.0 | 200 | 3 |

A light absorption layer, a liquid crystal layer, an ITO film, and a glass substrate were laid on the amorphous silicon type photoconductive layer thus formed, in the same manner as in the first embodiment.

With an AC voltage of 30 V applied between the opposed ITO films of the optical writing type electro-optical device manufactured above, image writing was conducted using 660-nm-wavelength light with a 0.4 μJ/cm² exposure. In this experiment, high-resolution, high-contrast images were produced.

As is apparent from the foregoing description, having the above structure, the optical writing type electro-optical device enables the optical modulation member to operate properly by controlling the impedance of the photoconductive layer without thickening it. Further, the adhesion of the amorphous silicon type photoconductive layer to the transparent electrode is improved. Further, it can be prevented that electrical characteristics of the device deteriorate due to diffusion of a trace of metal into the photoconductive layer from the transparent electrode. Thus, the electro-optical device can control the optical modulation member so that it exhibits a high photo-sensitivity and a high contrast.

What is claimed is:

1. An optical writing type electro-optical device comprising:

two transparent electrodes opposed to each other;

an optical modulation member having a memory function to which information is to be written by using an optical signal, the optical modulation member being disposed between the two transparent electrodes; and a photoconductive member comprising an amorphous silicon type photoconductive layer disposed adjacent to the optical modulation member, and a thin film disposed between the photoconductive layer and one of the two transparent electrode and made of a material having a band gap of not less than 3 eV.

2. The optical writing type electro-optical device according to claim 1, wherein the material of the thin-film is a semiconductive material or an insulative material.

3. The optical writing type electro-optical device according to claim 1, wherein the photoconductive layer is made of amorphous silicon hydride.

4. The optical writing type electro-optical device according to claim 1, wherein the material of the thin film is $TaO_x$.

5. An optical writing type electro-optical device comprising:

a substrate;

a first transparent electrode formed on the substrate;

an amorphous silicon type photoconductive layer;

an optical modulation member having a memory function to which information is to be written by light illumination, the optical modulation member being formed on the photoconductive layer;

a thin film disposed at an interface between the first transparent electrode and the photoconductive layer, the thin film having such a band gap as allows charge injection from the first transparent electrode to the photoconductive layer when the light illumination effected, and prohibits the charge injection when the light illumination is not effected; and a second transparent electrode formed on the optical modulation member.

6. The optical writing type electro-optical device according to claim 5, wherein the band gap of the thin film is not less than 3 eV.

7. The optical writing type electro-optical device according to claim 6, wherein the band gap of the thin film is in a range of 3 to 7 eV.

8. The optical writing type electro-optical device according to claim 7, wherein the band gap of the thin-film is in a range of 5 to 7 eV.

9. The optical writing type electro-optical device according to claim 5, wherein the thin film is made of $TaO_x$ where x is in a range of 1.0 to 2.5.

10. The optical writing type electro-optical device according to claim 5, wherein a refractive index of the thin film is not more than 3.

11. The optical writing type electro-optical device according to claim 10, wherein the refractive index of the thin film is in a range of 1 to 2.

* * * * *